(12) United States Patent
Agrawal et al.

(10) Patent No.: US 10,984,452 B2
(45) Date of Patent: *Apr. 20, 2021

(54) USER/GROUP SERVICING BASED ON DEEP NETWORK ANALYSIS

(71) Applicant: International Business Machines Corporation, Armonk, NY (US)

(72) Inventors: Bhavna Agrawal, Armonk, NY (US); Nikolaos Anerousis, Chappaqua, NY (US); Frank A. Schaffa, Hartsdale, NY (US); Jin Xiao, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 15/649,272

(22) Filed: Jul. 13, 2017

(65) Prior Publication Data

US 2019/0019221 A1    Jan. 17, 2019

(51) Int. Cl.
  *G06Q 30/02* (2012.01)
  *G06N 5/04* (2006.01)
  *G06Q 50/00* (2012.01)

(52) U.S. Cl.
  CPC .......... *G06Q 30/0269* (2013.01); *G06N 5/04* (2013.01); *G06Q 50/01* (2013.01)

(58) Field of Classification Search
  USPC ....................................................... 705/319
  See application file for complete search history.

(56) References Cited

U.S. PATENT DOCUMENTS

2009/0138427 A1   5/2009   Kalavade
2009/0199285 A1*  8/2009   Agarwal ............ H04L 63/0281
                                                      726/9
2009/0216682 A1   8/2009   Foladare et al.
(Continued)

OTHER PUBLICATIONS

Hotring Advertising Model for Broadband Hotspots, Jazilah Jamaluddin, Matthew Doherty, Reuben Edwards, and Paul Coulton (Year: 2004).*

(Continued)

*Primary Examiner* — Gautam Ubale
(74) *Attorney, Agent, or Firm* — Joseph Petrokaitis; Otterstedt, Wallace & Kammer, LLP

(57) ABSTRACT

Content is selectively provided to users of mobile devices within a venue including an on-site wireless network. User authorization requests and/or user account registration data are transmitted to the on-site wireless network from mobile devices within the venue. Attributes such as user interests and professions, which comprise inferred user profiles, are obtained using the network traffic data. Identities of mobile devices are established based on a combination including two or more of network identifiers, mobile device signatures, and browser signatures. The inferred user profiles are correlated with the mobile device identities. The inferred user profiles are aggregated into user profile groups and then matched with a content provider's intended target profiles. Content is transmitted to the mobile devices corresponding to the intended target profiles and based on correlation of the inferred user profiles with identities of the devices. Inferred user profiles may be verified using social and/or geographical data.

17 Claims, 6 Drawing Sheets

(56) References Cited

U.S. PATENT DOCUMENTS

| | | | | |
|---|---|---|---|---|
| 2010/0023392 | A1* | 1/2010 | Merriman | G06Q 30/0243 |
| | | | | 705/14.42 |
| 2010/0293062 | A1* | 11/2010 | Lukose | G06Q 30/02 |
| | | | | 705/14.73 |
| 2010/0313009 | A1* | 12/2010 | Combet | H04L 67/22 |
| | | | | 713/150 |
| 2012/0023127 | A1 | 1/2012 | Kirshenbaum | |
| 2012/0192258 | A1* | 7/2012 | Spencer | H04W 12/06 |
| | | | | 726/7 |
| 2012/0215589 | A1 | 8/2012 | Tavares et al. | |
| 2012/0278394 | A1* | 11/2012 | Zuckerberg | G06F 16/9535 |
| | | | | 709/204 |
| 2014/0223575 | A1* | 8/2014 | Nandi | H04L 67/306 |
| | | | | 726/27 |
| 2014/0304210 | A1 | 10/2014 | Bates | |
| 2015/0186951 | A1* | 7/2015 | Wilson | G06Q 50/01 |
| | | | | 705/14.66 |
| 2015/0370814 | A1* | 12/2015 | Liodden | G06Q 30/0201 |
| | | | | 707/738 |
| 2016/0019237 | A1* | 1/2016 | Dan | G06F 16/29 |
| | | | | 707/609 |
| 2017/0251070 | A1* | 8/2017 | Liu | H04L 67/02 |

OTHER PUBLICATIONS

Human Mobility Trace Acquisition and Social Interactions Monitoring for Business Intelligence Using Smartphones, A. Antoniou, E. Theodoridis, I. Chatzigiannakis, G. Mylonas (Year: 2012).*
Bhavna Agrawal et al., unpublished U.S. Appl. No. 15/859,617, filed Dec. 31, 2017, User/Group Servicing Based on Deep Network Analysis, pp. 1-37 plus 6 sheets of drawings.
Paul J. Otterstedt, List of IBM Patents or Patent Applications Treated as Related, Jun. 26, 2018, pp. 1-2.
Peter Mell and Tim Grance. The NIST Definition of Cloud Computing. Computer Security Division Information Technology Laboratory National Institute of Standards and Technology Gaithersburg, MD 20899-8930 Sep. 2011. pp. 1-7.
Big Five personality traits, From Wikipedia, the free encyclopedia, downloaded May 24, 2017 from https://en.wikipedia.org/wiki/Big_Five_personality_traits, May 24, 2017, pp. 1-30.

* cited by examiner

USER/GROUP SERVICING BASED ON DEEP NETWORK ANALYSIS

FIELD

The present disclosure relates to the servicing of mobile device users in large public venues.

BACKGROUND

Mobile communications and supporting networks have become widespread. In mobile communications, a variety of devices, such as cell phones, smart phones, and personal digital assistants, are used to receive many types of content including music and video programs. Mobile communications often involve three parties—the user of the mobile communications device, the operator of the mobile communications network, and a third party that provides the content. In this operation, the mobile communications network operator may have information, such as the location of the user of the communications device that might be useful to the content provider. The content providers might find this information useful for a number of reasons. For instance, this information might allow the content providers to better target content to particular users—that is, to send specific content to users that have a particular interest in that content. Targeting content is useful in a number of contexts such as mobile marketing. In mobile marketing, as with marketing in general, a population may be segmented into groups, and each person receives advertisements and other marketing information based on which segment of the population that person is in. Geographic segmentation is one common way of segmenting a market for targeted marketing. (Others include demographic and psychographic segmentation). Mobile marketing is a term applied to marketing via handheld devices such as cellphones, iPADs® (registered mark of Apple Inc. Cupertino, Calif., US) and other tablets, ebook readers, etc. For mobile marketing, in addition to the traditional geographic information (e.g. home address), the current and past locations of the user also are important for targeted marketing since these locations hint at demographic and psychographic segmentation of the user, in addition to indicating proximity of users to nearby business opportunities (e.g., a shopping mall or a boutique shop). User profiles, which comprise information about particular users, have been employed for customizing content presented to persons associated with the user profiles. User profiles have, for example, been used by content providers for identifying and presenting content deemed relevant to the users whereby the relevant content may be presented to the users and/or whereby a session where the content is presented may be tailored to the particular user (or group of users) in a manner that enhances the user experience. Group profiles can be obtained through the analysis of user profile attributes (e.g. demographics, user preferences).

In a Wi-Fi network, service providers can filter data by using contextual information and intelligence to provide analytics to enterprises. Since Wi-Fi networks are connected to mobile devices, location-based analytics can be used to deliver historical, real-time and predictive analytics about user behavior from devices and machine-to-machine communications. When gathered over time and combined with opt-in subscriber profile information, this data can uncover behaviors and provide context for each customer's current location and movement.

Stadiums, arenas, malls and other congested venues are often Wi-Fi enabled to facilitate consumer access to content providers. Network traffic carried on venue networks is vast and contains valuable information. Existing efforts in network analytics focus primarily on geolocation and aggregating baseline network data (e.g. traffic volume, types of mobile devices, website visited (if HTTP)). FIG. 5 shows an exemplary approach that includes data aggregation 520, IP reverse lookup 522, and deep packet inspection (DPI) 524. The examination of the payload during deep packet inspection is a relatively difficult process that is not conducive to providing results in real time or close to real time.

SUMMARY

Embodiments of the present disclosure provide techniques for user/group servicing based on deep network analysis.

A method for providing content regarding users of mobile devices within a venue comprising an on-site wireless network is provided. The method includes processing user authorization requests and/or user account registration data transmitted to the on-site wireless network from mobile devices within the venue and obtaining hashed user identification data and network traffic data from the on-site wireless network. The network traffic data includes URLs and IP headers. Inferred user profiles are obtained based on the URLs and IP headers obtained from the network traffic data. These inferred user profiles are then aggregated into user profile groups that match one or more user profile models. The user profile groups are matched with a content provider's intended target profiles. Content is transmitted to selected ones of the mobile devices based on one or more of the user profile groups matching the content provider's intended target profile and based on the correlation of the inferred user profiles with the identities of the mobile devices.

Additional aspects of the disclosure are directed to a system for providing content regarding users of mobile devices. The system includes an on-site wireless network configured to process user authorization requests and/or user account registration data from mobile devices within a venue and facilitate communication between authorized mobile devices within the venue and content providers. A network analytics engine is configured for receiving hashed user identification data and network traffic data from the on-site wireless network and obtaining inferred user profiles using URLs and IP headers within the network traffic data. The network analytics engine is further configured for aggregating the inferred user profiles into user profile groups and matching them with a content provider's intended target profile. The on-site wireless network is further configured for transmitting content to selected ones of the mobile devices based on one or more of the user profile groups matching the content provider's intended target profile and based on the correlation of the inferred user profiles with the identities of the mobile devices.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide reliable device and/or user identity by combining data unlikely to be subject to dynamic changes.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
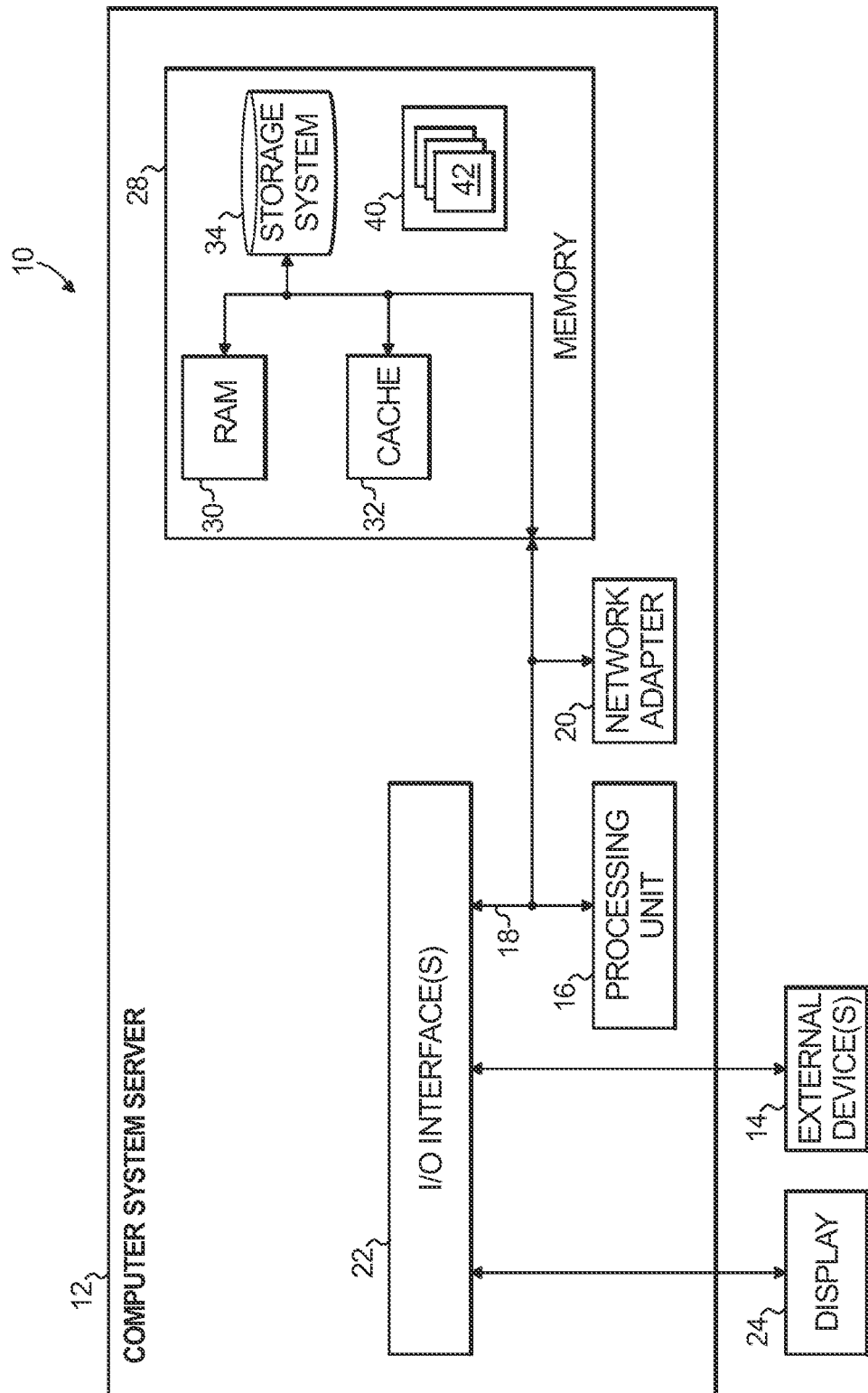
FIG. 1 depicts a cloud computing node according to an embodiment of the present invention.

The subject matter of the instant application will be described with reference to illustrative embodiments. For this reason, numerous modifications can be made to these embodiments and the results will still come within the scope of the invention. No limitations with respect to the specific embodiments described herein are intended or should be inferred.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
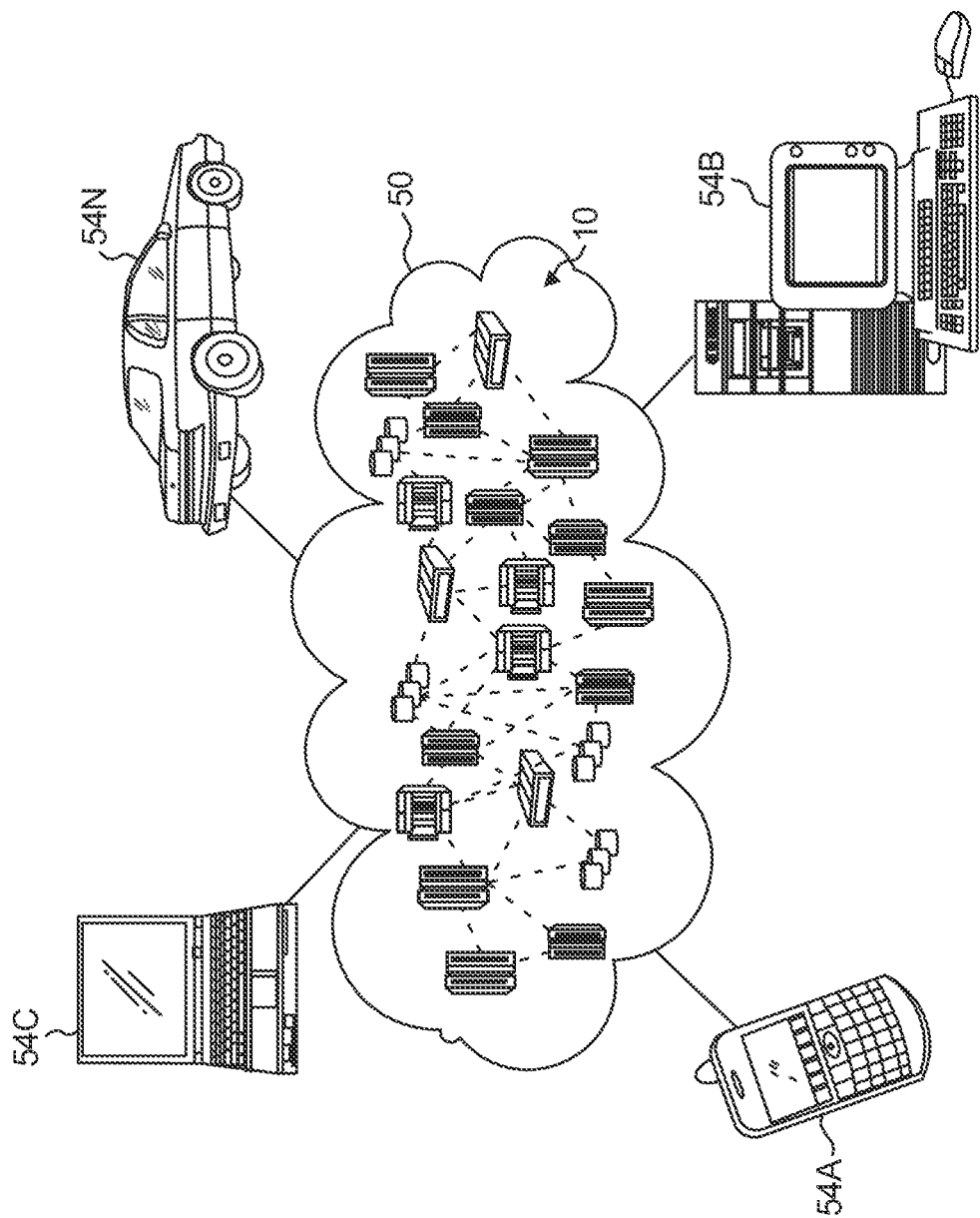
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
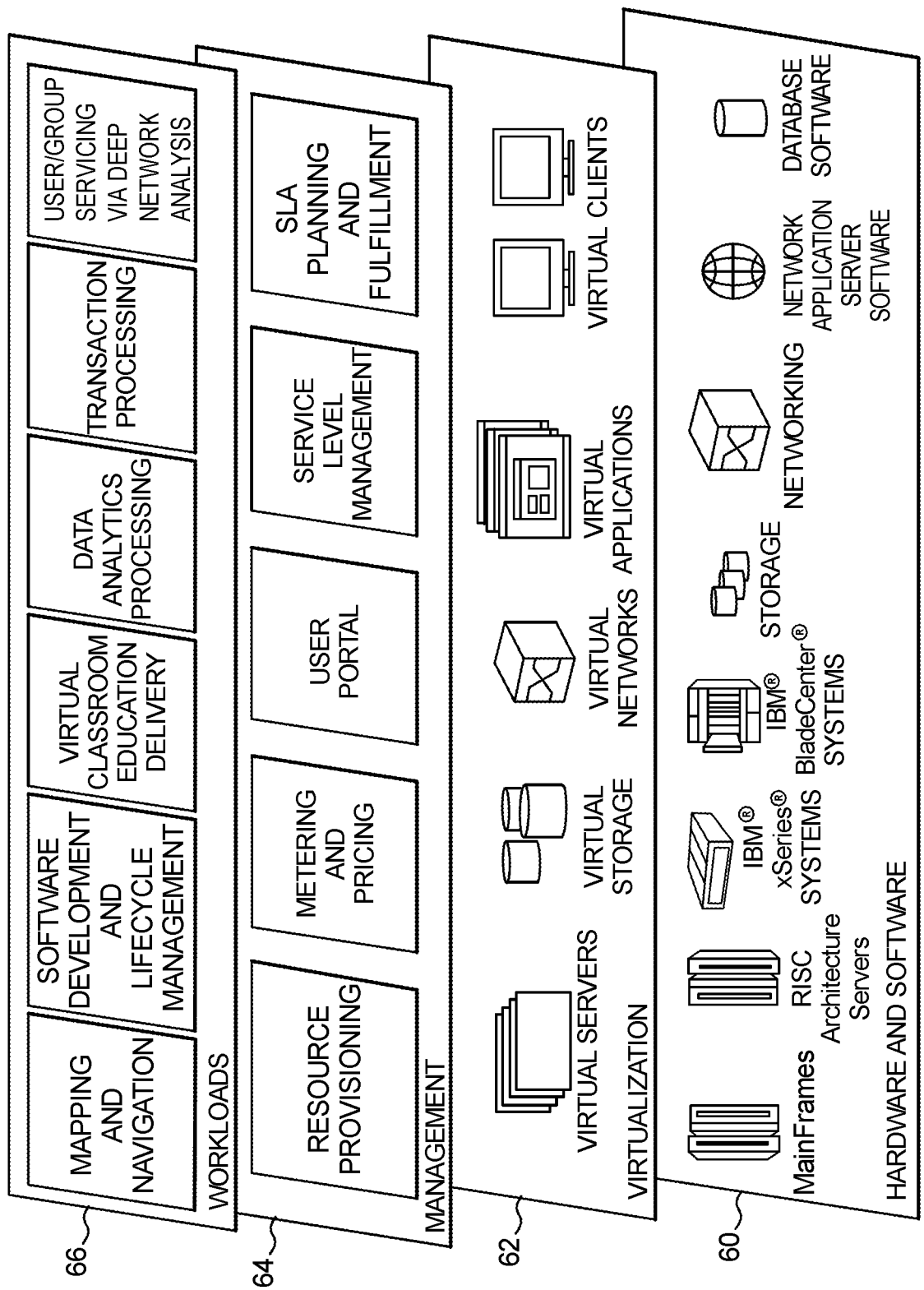
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and aspects of user/group servicing based on deep network analysis, as disclosed herein.

Advantages may be obtained by understanding mobile users in large venues such as sports stadiums and arenas, fairgrounds, airports, amusement parks, shopping malls, and convention centers. Network traffic carried on a venue network is substantial and contains valuable information. Deeper network analytics combined with contextual learning and social correlation can yield comprehensive, reliable and rich user/group profiles that are not possible with single sources of data. Passive network analysis is relatively fast (near real-time), pervasive and non-intrusive, having relatively few infrastructure requirements, no app installations required and/or active mobile communication (Bluetooth low energy/BLE), no requirement on client side support such as JavaScript, cookies, etc. which are not expected to be available universally on mobile devices, and optional social sign-on. A venue operator that provides the network employs information from traffic on the network to build models of the users of the network. Using on-site, baseline network traffic data (authentication messages, IP headers and HTTP URLs) and deep network analysis (aggregation, learning, correlation, and inferencing) user profiles are effectively discovered. The understanding of the demographics of visitors to a venue allows the discovery of new business opportunities and/or the offering of intelligent services. It can further assist venue operators in identifying potential crowd conditions, security issues, and the prediction of network congestion. Personalized services such as digital concierge services and targeted ad placement can further be based on visitor demographics.

Figure 4:
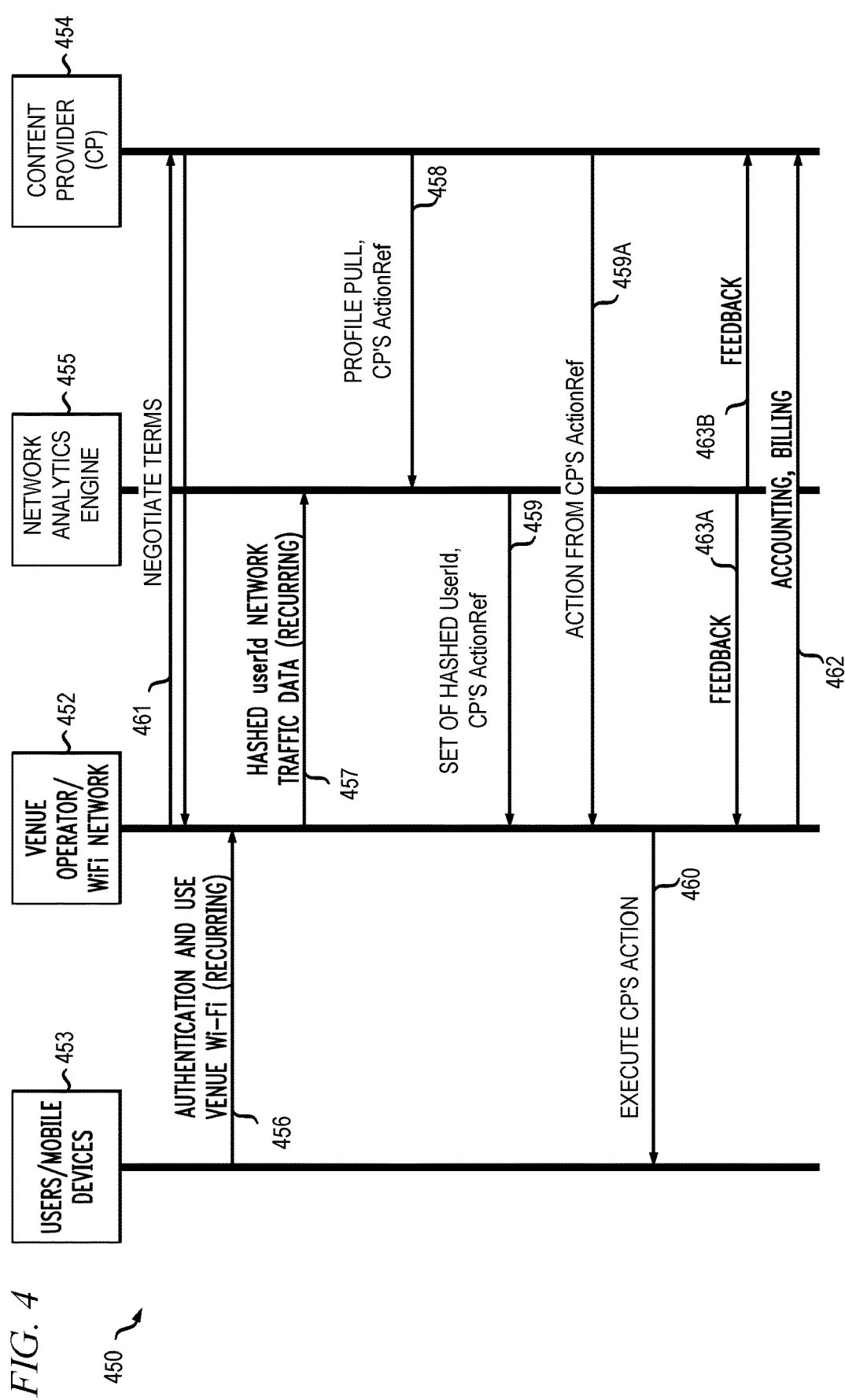
FIG. 4 is a schematic diagram of a system for providing targeted marketing to users or groups of users while maintaining user anonymity.

Referring to FIG. 4, a communications environment 450 is disclosed that facilitates the wireless distribution of content by a venue operator 452 to users 453 having devices configured for wirelessly receiving the content. The content is obtained, at least in part, from a content provider 454 such as a marketer of products or services. User anonymity is maintained while delivering targeted marketing or other targeted content within the environment 450. In an exemplary embodiment, the venue operator 452 comprises a Wi-Fi network including access points for wireless communication with the users' handheld devices such as cellphones or tablets. The Wi-Fi network is provided in a large public or private venue such as a stadium, arena, airport, convention center or other geographically discrete area likely to include a large number of persons within a predefined area. Such networks are also feasible in temporary venues such as fairgrounds. The content provider may comprise one or more content providers. The communications environment 450 includes a network analytics engine 455 that is provided with profiles of hashed users, but does not have the identity of actual users or their devices (collectively 453) within the venue. The venue operator 452 obtains user account information and user device media access control (MAC) data, but is not provided with the profiles associated with each user. The content provider 454 pulls a desired profile group to target and executes an action directed to the desired profile group, but does not know the set of users matching the profile.

As indicated in FIG. 4, authentication data is provided by the users to the venue operator to obtain network (e.g. Wi-Fi) access. Various authentication protocols (for example, SIM-based authentication) are known to the art and can be employed in the environment 450. The EAP-SIM standard, for example, is a protocol that allows wireless LAN users to authenticate access to a wireless LAN network using a mobile phone SIM card. User credentials from a SIM card are delivered to a Wi-Fi access point to initiate the authentication request in some embodiments. SIM cards uniquely identify a user to a GSM system and contain the user's IMSI (International Mobile Subscriber Identity). Once authentication is established and access to the venue network is obtained, users are able to employ their mobile devices for mobile Internet access. The Internet is a worldwide collection of computer networks and gateways that use the TCP/IP suite of protocols to communicate with one another. At the core of the Internet is a backbone of high speed data communication lines between major nodes or host computers including thousands of commercial, government, education, and other computer systems that route data and messages. The users will use the wireless connection to send and receive Internet traffic for a period of time following authentication. Users may, for example, access websites, download apps, send and receive SMS messages, use a Twitter account, or take other actions. Step 456 encompasses both user authentication and subsequent use of the venue wireless network by the users.

The venue operator 452 sends and the networks analytics engine 455 receives hashed userID information and network traffic data from the venue operator in step 457. This information is not transmitted to the content provider. One or more firewalls may be incorporated within the networks analytics engine to prevent the venue operator and/or the content provider from obtaining selected information from each other. Referring again to FIG. 4, the content provider 454 specifies desired profile group(s) to target, the desired action(s) to execute on the group(s), and conveys such information to the networks analytics engine 455 in step 458. (The term "ActionRef" is a reference ID of the desired action(s) the content provider wants executed by the venue operator). While the content provider is unaware of which, if any, users at the venue match the pulled group profile, deep network analytics combined with contextual learning and optionally social correlation provide rich user/group profiles which will allow the content provider, through the venue operator, to reliably reach its intended audience with targeted content. Deep network analysis of network data is discussed below with respect to FIG. 5. In step 459, a set of hashed userIDs corresponding to the content provider's targeted group is provided by the networks analytics engine 455 to the venue operator, which executes the content provider's action in step 460. User devices 453 receive targeted information from the content provider(s) via the venue operator 452 though the venue operator does not know the profiles associated with each user. The targeted information may be displayed on graphical user interfaces of the devices 453. The ActionRef is passed to the network analytics engine 455 from the content provider 454 along with the desired profile to execute the action on. This ActionRef is then passed from the network analytics engine 455 to the venue operator 452 along with the list of users (Hashed UserId) the action should be executed on. The venue operator then executes the action referred to by the ActionRef on this list of users in step 459A, by mapping the hashed userId to the network reachable addresses of those users (e.g., IP, MAC, etc.). As indicated above, ActionRef is an identifier defined by and originating with the content provider 454. The Network Analyzer 455 only needs to know the ActionRef ID to pair it with the set of generated hashed userId data in step 459, since the Action is not executed by the Network Analyzer but rather by the venue operator 452.

Appropriate terms 461 are negotiated between the venue operator and content provider(s). The venue operator can accordingly be compensated for executing the content providers' actions. Accounting/billing information is provided to the content provider in step 462. Feedback 463A, 463B is provided by the network analytics engine 455 to the venue operator 452 and content provider 454, respectively. The feedback may include handshake responses affirming connection to the network analytics engine. The feedback 463B directed to the content provider may further include the size of the profile group sent to the venue operator 452 via the network analytics engine 455 for a specific content provider's intended target profile(s).

Figure 5:
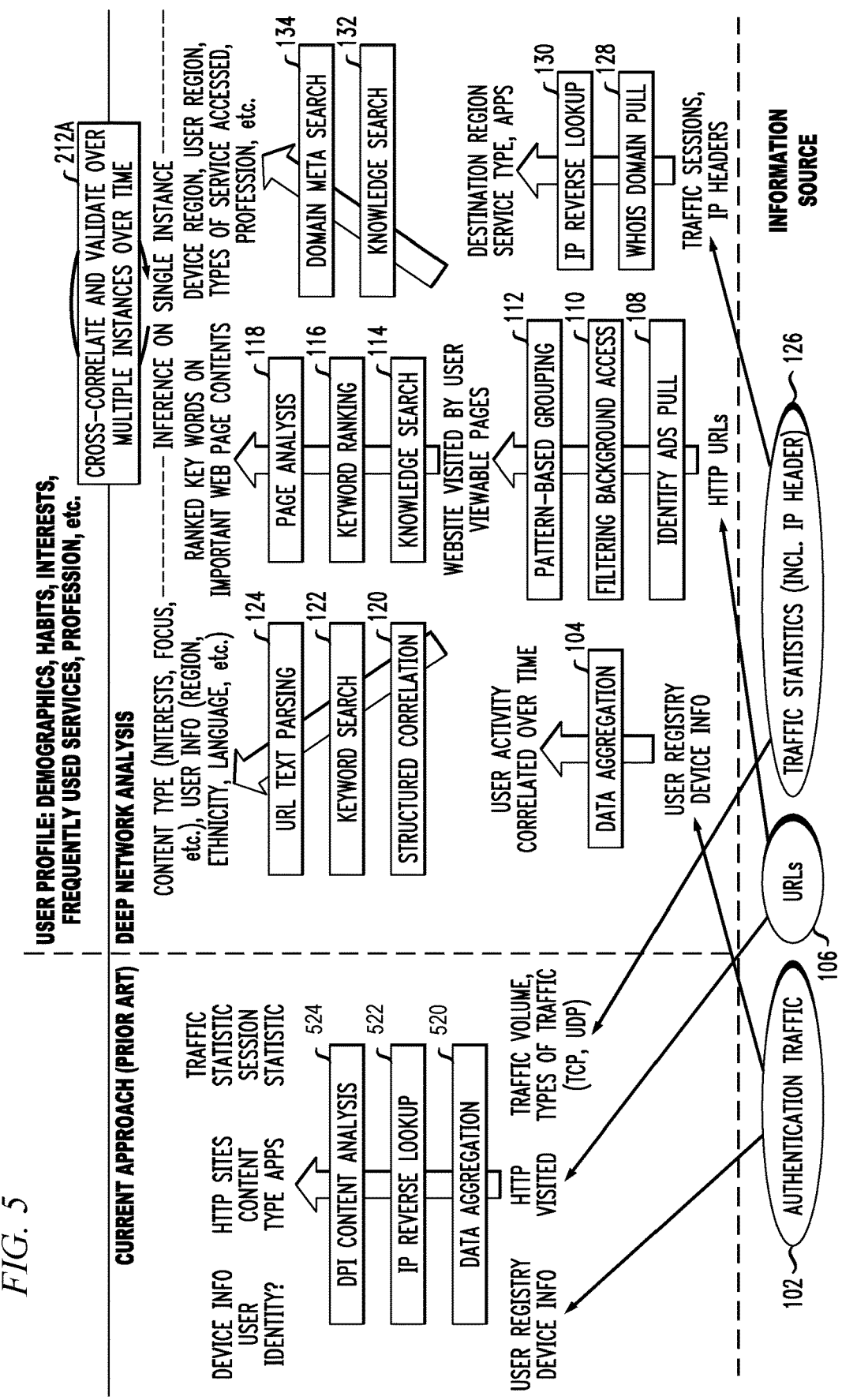
FIG. 5 is a flow chart showing deep network analysis of network traffic in accordance with the present disclosure and a comparative flow chart of a prior art approach.

Referring to FIG. 5, a flow diagram is provided for obtaining user profiles based on deep network analysis. The user profile is based on demographics, habits, user interests, frequently used services, user profession, and/or other information that is obtainable with reasonable confidence. Network data is employed to obtain inferred user profiles. The network data is optionally supplemented by geolocation data and social data. Network data refers to data obtained from IP network communication channels; geolocation data refers to the identification of user location based on user/device association with one or more geolocated devices (e.g. access point, Beacon, RFID reader); social data refers to data obtained from social network platforms such as Facebook® (registered mark of Facebook Inc., Menlo Park, Calif., USA), Twitter® (registered mark of Twitter, Inc., San Francisco, Calif., USA), and/or chat apps or possibly via user registry device information.

As discussed above with respect to FIG. 4, authentication information is obtained by the venue operator and includes user registry device information. Such information from the authentication traffic 102 and other data points are subjected to data aggregation processing at 104 so that user activity is correlated over time. Data aggregation 104 as employed in the flow diagram associates a set of data points (102, 106 and 126) to specific users/mobile devices. The mechanism for data aggregation 104 used in accordance with the flow diagram provides reliable device/user identity by combining data that is unlikely to be subject to dynamic changes, and is an advance over the prior art "current approach", also outlined in FIG. 5. Instead of taking a network identifier (such as IP or MAC) as the exclusive device/user identifier as in some prior art approaches, device/user identity is established based on a combination of network address (IP, MAC), device signature (make, model, OS) and browser signature (browser name, type, version). This approach has higher accuracy and is able to function in the presence of network address obfuscation techniques (e.g., mobile device dynamic changes of the IP or MAC address). The authentication traffic information 102 contains network identifiers (IP, MAC), device signature (make, model, OS) and browser signature (browser name, type, version). A unique identifier is created for the device based on all of this information and this unique identifier is then associated with a network identifier (MAC or IP) on a per session basis. Accordingly, even though the network identifier may be different for the same device between different sessions, the system is able to deduce the device as belonging to the same user. Consequently, the mobile device is uniquely identified and has a temporally associated network address at any given time. All data points in the URLs 106 and traffic statistics 126 are therefore associated to a unique device based on the recorded network address and time. This is the process of data aggregation 104 as identified in FIG. 5, which is to help uniquely identify and track a device over time.

Social data can also be associated with user sign-in during authentication and/or user account registration. Structured user profile data can further be obtained by performing a social data crawl or scrape. While not all social media sites can be scraped for information, those that can be scraped can be used to extract data on the basis of keywords, geography, and/or other input or combinations thereof. Social media crawling and scraping services are commercially available and continue to be developed.

Uniform Resource Locators (URLs) 106 provided by the venue operator network in step 457 to the network analytics engine 455 (FIG. 4) are employed to identify viewable web pages pulled by the users by using steps 108, 110 and 112. Websites visited by the user(s) include viewable pages that are likely of interest to the user(s), though there are often complexities in such platforms arising from, for example, social plugging, back-end data collecting and/or advertising. Such "noise" is removed in order to facilitate deep network traffic analysis relating to the web pages of actual interest to the mobile device users, thereby enhancing the process of obtaining inferred user profiles with confidence that the inferred user profiles are likely to be accurate. Ads are identified and pulled in step 108. Background access is filtered in step 110 and pattern-based grouping is conducted in step 112. Background access filtering is the process of eliminating URLs that are not part of the user's active web view, including advertisement embedding, social platform plugin communications (e.g., Facebook®, Twitter®, etc.) and data/cookie collection calls. Pattern-based grouping is used to determine whether the remaining URLs are actually viewable by removing dynamic pages (e.g., jsp) and web objects (.png, .jpg, etc.). The output of the processing of URL information 106 accordingly identifies a website visited by the user of a mobile device, and more particularly the viewable page(s) accessed by the user.

Traffic statistics (including IP headers) 126 obtained in step 457 are processed using steps 128 (Whois domain pull) and 130 (IP reverse lookup). As known in the art, an Internet protocol (IP) header is a prefix to an IP packet. The IP header contains various fields, and includes information about IP version, source IP, destination IP, and other data. Whois data may include the date the domain was registered and when it expires, the registrant name, the registrant's email address and phone number. An IP reverse lookup is performed to see how many websites are being supported on a shared hosting server. The destination region(s), service type (e.g. HTTP, FTP, Mail, etc.), and apps utilized by the users of the mobile devices within the venue may be obtained from analysis of the user traffic sessions and IP headers 126 detected therefrom. As discussed below with respect to FIG. 6, a first series of processes using the information sources 102, 106 and 126 is employed to obtain data that is suitable for deep network analysis. This first series of processes, which includes step 104 (data aggregation), steps 108-112, and steps 128-130 are conducted in a data content analyzer 208 incorporated as part of the network analytics engine 455 in the system 450. Enriched, relatively clean data obtained from the first stage of processing facilitates a subsequent second stage of processing described below.

Figure 6:
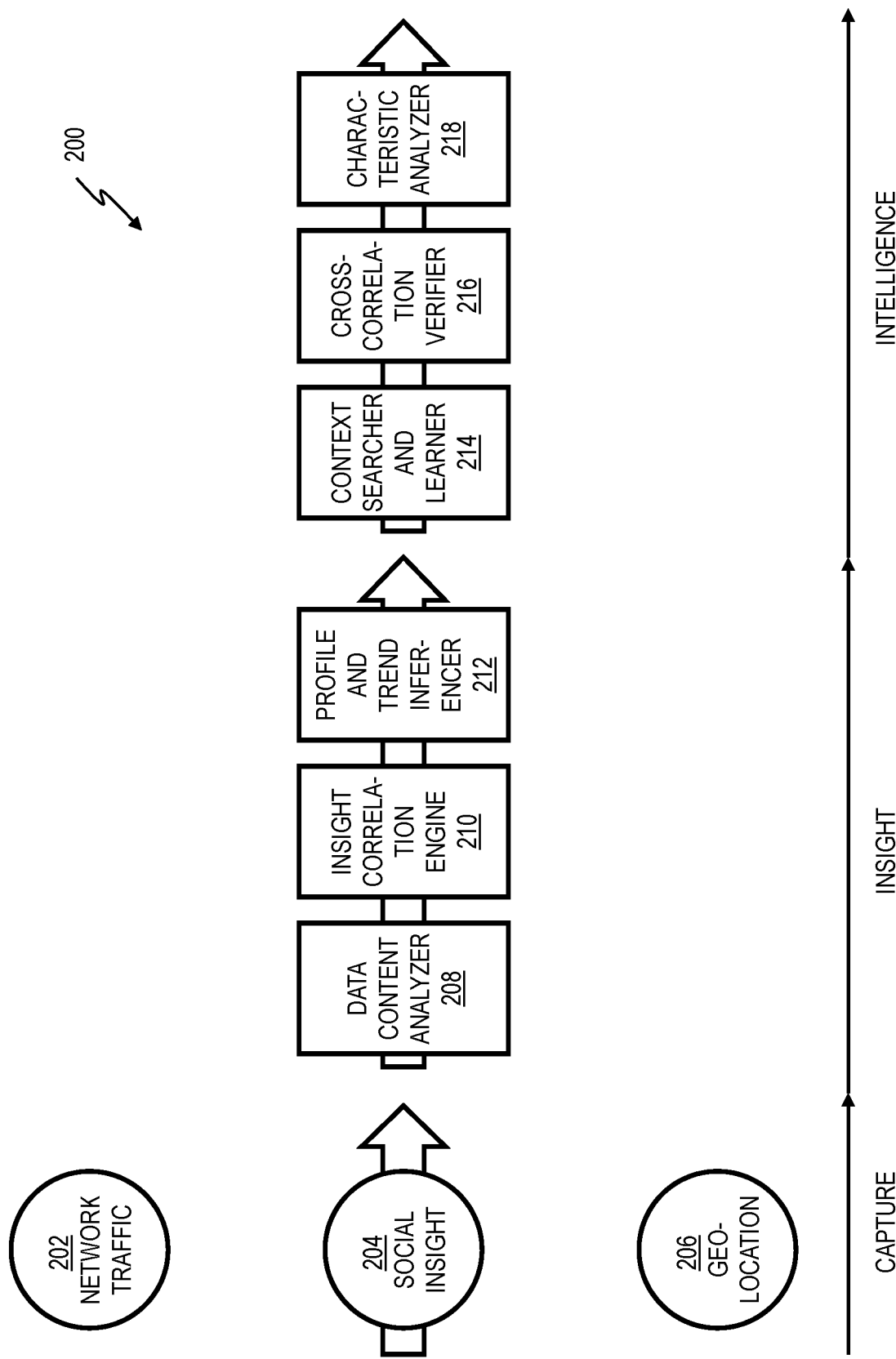
FIG. 6 is a flow chart and block diagram showing use of a system to process network traffic, social insight and geolocation data in obtaining user profiles.

A second series of steps using outputs from the data content analyzer 208 is performed using an insight correlation engine 210 as referenced in FIG. 6. Steps 114, 116 and 118, which follow the steps 108, 110, 112 based on URL data 106, include a knowledge search, keyword ranking, and web page analysis, respectively based on the viewable pages of a website visited by a mobile device user. The knowledge search 114 includes categorization of the types of pages based on the URL domain it falls under. A ranked keyword classification is generated in step 116. The keyword ranking is used to determine the type(s) of pages that are referenced by mobile device users. A ranking of keywords is generally a metric output by a web content analysis solution. Page analysis 118 is the process of performing web page content analysis by identifying the most relevant (ranked) keywords and correlations among keywords (can be loose or strong) on the page and inferring category(ies) or user interests from them. Page analysis may further include graphical analysis of images referenced using Instagram or other such apps. Based on ranked keywords, the analysis of URL information is able to provide further segmentation of the users based on interests (e.g., food, coffee, apparel, outdoor sports), and match them to target profiles deemed important to specific content providers.

Structured correlation 120, keyword searching 122 and URL text parsing 124 are further processes that are performed based on the viewable pages of websites visited by user(s), which are ascertained using steps 108, 110 and 112. Structured correlation is applied to the URL text string itself to extract structural information and infer page structure of the web server and to identify data items of interest. For instance, structured correlation can involve extracting parameters from REST API (application program interface) calls. As known in the art, REST (representational state transfer) is often used in mobile applications and social networking websites. URL text parsing is employed to obtain the protocol, authority, host name, port number, path, query, filename, and reference from a URL; as known in the art, such components are obtainable from HTTP URLs. Steps 120, 122 and 124 provide content type (user interests, focus) and other user information such as region, demographic group(s), and language. Keyword search 122 is performed on the raw URL string itself to match any word topic of interest (e.g., sports, food, cooking, electronics, etc.).

The insight correlation engine 210 provides a second stage of processing of the data obtained from the initial stage processing (steps 128, 130) of the network traffic statistics, including the IP header data 126, in addition to the further processing that follows initial stage processing of URL data 106 by the data content analyzer 208. A knowledge search 132 for non-HTTP traffic categories based on destination IP address(es) is conducted. (As discussed above, the knowledge search 114, in contrast, involves a search for web page categories based on URLs.) A domain meta search 134 provides device region, user region, the types of services accessed, and/or the user's profession. Meta search engines use more than one search engine. Such an engine accepts a search query and sends the search query to a limited set of search engines. The results retrieved from the various search engines are then combined to produce a result set. Inferences relating to a user's region of origin can, for example, be obtained based on the accessing of websites that are frequented mostly by persons from particular regions. Use of a mobile device by a person visiting a venue may accordingly indicate, via IP header data, that the person is either a tourist or a local resident. Based on the two stages of processing the information obtained from the information sources 102, 106 and 126, an inference of the user profile based on a single instance of a mobile device user's accessing a website is obtained.

A profile and trend inferencer 212, which is designated in FIG. 6, is employed for a third stage of processing. An inferred user profile can be obtained from the deep network analysis of network data obtained from a single instance of mobile device use to access a website, as indicated in FIG. 5. The third stage includes cross-correlation and validation over multiple instances (e.g. multiple web page and/or multiple website visits) over time of mobile device use (step 212A in FIG. 5) to obtain inferred user profiles reflecting, for example, user demographics, habits, interests, frequently used services and profession. In some embodiments, user profiles are validated through the use of models that correlate user profiles with data such as content type, ranked key words, device/user language and/or region obtained through deep network analysis. Models may be preferred where users are only expected to stay within a venue for a relatively short period of time, such as while attending a sporting event. Such models may be stored within an electronic memory associated with the profile and trend inference 212 or be cloud-based (see layer 66 in FIG. 3). Artificial neural networks that learn from observed data may be feasible in situations where sufficient informational data is available and the users are expected to remain within a venue (e.g. a resort or a school) for an extended period of time.

FIG. 6 shows an exemplary system 200 that enables the processing of network data as described above with respect to FIG. 5. Geolocation and social data are optionally employed within the process flow of the system 200 to build a context for the user profiles obtained from the network data and/or to provide further verification of such profiles. Network traffic 202 is captured in step 457 and processed using the data content analyzer 208, the insight correlation engine 210, and the profile and trend inferencer 212 as described above. Such network traffic, once analyzed, provides short-term user interests and habits in a real-time context. The user may, for example, browse news sites and follow news from a particular geographical region. The extent to which the user employs his phone or tablet at a venue is considered indicative of his interest or lack of interest in the activities at the venue. Someone interested in venue activities would likely prefer content relating to such activities. A disinterested person would likely be more receptive to content reflecting his/her network traffic. Social insight 204 obtained from social data provides long term social connectivity and personality. As discussed above, social data may be provided with user sign-in during venue network authentication or account registration or from social network platforms. Standard social data crawls may be employed to obtain user profile data and social relations. Geolocation data is known in part from the user's presence in a venue in which the network can be accessed. The "hot spot" accessed by a user provides more particular geolocation data. Bluetooth-based beacon technologies can also provide (x, y) geo-coordinates with high accuracy. Smart phones or other mobile devices can capture beacon signals within the venue and distance can be estimated by measuring received signal strength. The inferred user profile from network analysis is cross-matched with user social profile and/or geolocation data to validate/strengthen user data fidelity. Reliance solely on network data is sufficient in many instances but can be inaccurate in some. For example, network data can, in some cases, infer a user is in the 30-40 year old age group based on matching habits and app usage while actually being over fifty and relatively tech savvy. Social data by itself can also be inaccurate or outdated. If the situational insight obtained from network analytics obtained following the procedures described above with respect to FIG. 5 is in correlation with the user personality obtained from social data, the higher confidence level in the user profile can drive actions by the content provider and/or venue operator with greater confidence. A venue operator may provide, for example, content relating to digital concierge or other personalized services or encouraging participation in venue events while the content provider provides marketing information, the content provided to each user or group of users being influenced by the networks analytics engine 455 including the data content analyzer 208, the insight correlation engine 210 and the profile and trend inferencer 212.

Referring again to FIG. 6, geolocation 206 data is further included in discovering user/group profiles. The general location of the users is known from their use of the venue network, such as a venue Wi-Fi network, that places the users within or at least near the venue. More particular locations of users is obtained by their use of particular "hot spots" (physical locations where people may obtain Internet access via the venue operator's wireless local area (e.g. Wi-Fi) network (WLAN) using a router connected to an internet service provider (ISP) or detection via beacons. Network traffic data is captured, processed and correlated to particular mobile devices in a first sequence as shown in the flow diagram of FIG. 4, which is likely to provide meaningful user profiles that sufficiently match the target user profiles of content providers. Such network traffic data is processed by a data content analyzer 208, an insight correlation engine 210, and a profile and trend inferencer 212. The data content analyzer 208 performs a first stage of deep network analytics (FIG. 5) to generate a wide range of data points (e.g. Telco provider, OS type/version, apps, and/or websites visited) associated with a mobile device user. Insight correlation engine 210 then aggregates these data points based on learning and/or pre-defined modeling to determine the validity, rarity and relations of the data points. It further aggregates data that are similar, and filters away data that are scarce or contradictory in a second stage of network analytics as described above with respect to steps 114-118, 120-124, 132-134. Cross-correlation and validation in step 212A is performed over multiple instances of deduced user profiles. These individual instances of deduced user profiles are combined into a Validated User Profile by aggregating and promoting similar user attributes across multiple profile instances (greater confidence of being true) and demoting attributes that only appear in few profile instances (less confidence of being true). The outcome of step 212A is then a list of validated user attributes each with varied degree of confidence. A threshold confidence cut off value can be applied to the list to determine the subset of attributes included in the Validated User Profile.

The Profile and Trend Inferencer 212, which performs cross-correlation and validation in step 212A, consumes the now cleaned and consistent data and matches it to a set of profile models to infer profiles and characteristics of the users with varied degree(s) of confidence. The only additional step taken is to match attributes provided by the user profile produced from step 212A with the content provider's target profiles. The trend inferencing performed by the profile and trend inferencer 212 includes a summary analysis of the top attributes exhibited by the majority of the user profiles (hence trends). Processing of the network data captured from the venue network and the inferences of user profiles therefrom allows one or more of the identification of potential business opportunities for the content provider or venue operator, the inference of user interests, and the identification of events or developments of potential interest to the venue operator. The venue operator may, for example, wish to know of congestion within a particular venue location so that steps can be taken to alleviate such congestion. By aggregating the inferred user profiles into user profile groups, mobile device users within such groups can receive content from the content provider 454 via the venue operator 452 provided that the profile groups sufficiently match the content provider's target profile(s). Exact matching of profile groups with target profiles may or may not be required for execution of an ActionRef from the content provider.

Network data processing using elements 208, 210 and 212 is supplemented using a context searcher and learner engine 214, a cross correlation verifier 216 and a characteristic analyzer 218 in some embodiments. The context searcher and learner 214 supplements the inferred user profiles from the profile and trend inferencer 212 with geolocation 206 and social insight 204 information to provide the inferred insights with geo and/or social contexts. Cross-correlation verifier 216 takes in multiple inferred insights in geolocation and/or social context associated with the same user, evaluates (with learning or models) the confidence of the inferred insights in context, and removes conflicts and/or scarce cases. The inferred user profiles obtained from the traffic data are accordingly correlated with social profiles and/or geolocation data that are consistent with the user traffic data to obtain further verification of the inferred user profiles and therefore a higher level of confidence in the inferred user profiles. The characteristic analyzer 218 aggregates the now verified insights and constructs the final user profiles. The characteristic analyzer takes in data points from user profile through a series of characteristic models, which may be business action driven (e.g., predict likelihood of user's intent to purchase coffee, deduce visitors of the country likely to shop, etc.), and constructs the final grouping of users based on the set of profiles a marketer or other content provider intend to target. As discussed above, the characteristic analyzer 218 may be employed to perform this function in the absence of social and/or geo data.

Statistics packages such as IBM's SPSS Statistics are among those than may be used for interpreting data. Classification algorithms translate the data into desired metrics. Analytics models and data sources are stored on a cloud in some embodiments (see FIG. 3).

Still referring to FIG. 6, elements 202, 204, 206 represent the raw data feed (data capture). For example, social insight 204 may comprise an application programming interface (API) data stream from a social networking site; and geolocation feed 206 may be obtained from a geolocation device (e.g., Wi-Fi access point, beacon service, "smart" phone's on-board GPS, or the like). Network traffic 202 is typically provided as a data stream from the access points or controllers themselves, and/or from an additional management service residing on a Wi-Fi network (e.g. authentication servers). A physical data source emits the traffic.

Data content analyzer 208 carries out data annotation and access; depending on where the source information comes from, data content analyzer 208 may reside locally in the physical environment (in close proximity to the data source) or may reside on a cloud server (e.g., in the case of social media). Data content analyzer 208 processes the raw data feed and passes the processed data to the insight correlation engine 210 so that engine 210 can generate insights. Data content analyzer 208 may be physically implemented, for example, as data analysis software on an analysis server in the back end of the wireless network (with data feed obtained from the main network switch). Data content analyzer 208 carries out one or more of data enrichment, data correlation, data transformation, and the like, for the purpose of being able to correlate the data by (single) identity and collect all the time stamp information so as to transform the data to a time series. Data content analyzer 208 can also undertake reverse lookups, enrichment, and the like. In a non-limiting example, data content analyzer 208 is implemented using a streaming process such as SPARK.

The output of data content analyzer 208 is a set of correlated enriched information or data points regarding a single device over a wide range of time; e.g., a time series. Insight correlation engine 210 takes the information output by data content analyzer 208 as input clues and undertakes machine learning to output insights; e.g., from looking at certain observations, certain conclusions can be drawn re demographics, profession, interests, and the like, for an individual in question. A variety of pattern recognition and/or data modelling techniques can be employed. For example, a human expert annotates a corpus of data to be used for training purposes (training corpus). Some portion of the corpus of data is reserved for a test corpus. Insight correlation engine 210 typically undertakes computationally intensive processes and may advantageously be implemented using software on one or more powerful servers residing in the cloud (scalability is another advantage of a cloud-based solution).

By way of review, data content analyzer 208 undertakes data transformation, enrichment, and attachment to make the data more useful. Insight correlation engine 210 creates data points similar to those that one would typically get from a social network or the like (where there is no need to infer where someone is from or what his or her profession is since this information is actually know as part of the person's profile). Profile and trend inferencer 212 examines the data points pertaining to an individual, over time, and tries to identify a coherent profile and/or a coherent set of trends related to the individual. Profile and trend inferencer 212 may be implemented, for example, using software residing on a cloud-based server due to computational intensity. In this regard, data content analyzer 208 may output millions of data points; insight correlation engine 210 may output thousands of insight points; and these insight points are fed into the profile and trend inferencer 212. Profile and trend inferencer 212 may output, for example, on the order of ten profiles and insights about a particular device. Profile and trend inferencer 212 may be implemented, for example, using a business model. For example, likely purchasers of an economy car will have a different profile than likely purchasers of a luxury car. Individuals will be identified by age, profession, and interests, for example—human business analysts may create these models in one or more embodiments (e.g., luxury car buyer is 55-65 years old, established professional, interested in golf; economy car buyer is 25-30 years old, recently-graduated professional, interested in mountain biking). A business individual (sponsor, advertiser, e.g.) has a particular profile in mind that it is desired to match (i.e. match insights/inferred profile).

Insight generation may be established, for example, within a few days of looking at individual behavior. Context searcher and learner 214, cross-correlation verifier 216, and characteristic analyzer 218, on the other hand, may relate more to long-term intelligence gathering. The data generated at 208, 210, and 212 may, for example, be stored in a cloud-based back end. Context searcher and learner 214, cross-correlation verifier 216, and characteristic analyzer 218 form, in essence, an intelligence component which "peels back" the data for long term post-analysis based on a longer period of tracking of a device and the associated individual. Regarding context searcher and learner 214, "context" refers to the nature of an event and an associated physical location (e.g., mall, restaurant, hotel, stadium). Context searcher and learner 214 associates the context with the insights and profile deduced about a device; i.e., carrying out context attachment. For example, an individual visiting a stadium may exhibit very different behavior than the same individual visiting a hospital. Context-dependence permits fashioning a better, multi-dimensional user profile. Context searcher and learner 214 uses a machine-learning process to associate a typical behavior with a context, and determine how an individual's profile deviates from or conforms to a particular norm. Pattern recognition and anomaly detection are employed in one or more embodiments.

Cross-correlation verifier 216 addresses, for example, cases where the inference was wrong; for example, due to false positives and/or false negatives in machine learning and/or unexpected user behavior or behavioral outliers. Cross-correlation verifier 216 examines the same individual, given the past history of similar contexts, and filters out conflicting profiles and/or outliers. "Cross-correlation" refers to looking across the entire history to obtain good convergence of profiles of behavior. Cross-correlation verifier 216 may use, for example, clustering techniques to examine for correlations within the clusters. Characteristic analyzer 218 embeds what was learned with the long term tracking and learning performed on the social network feed for the individual, so as to provide characteristic clues or correlations over the individual's behavior (e.g. emotions, temperament, big five personality traits (openness to experience, conscientiousness, extraversion, agreeableness, and neuroticism)) to model how an individual's emotional state influences that person's behavior in context. Element 218 may be implemented, for example, via annotation—looking at the emotional big five outcome of the individual, time-stamped, and correlated with the context and profile generated in the same time period. Time-correlated data-stitching software can be used.

In one or more embodiments, elements 214, 216, and/or 218 are computationally intensive and may be implemented, for example, as separate processes residing in the cloud and directly tapping into the data links. Insight portions 208, 210, 212 may be real time or near-real-time, which process the data and inject the processed data to the data link, whereas the intelligence portions 214, 216, 218 are longer-term offline batch processes that tap into the data link and carry out additional processing as set forth herein.

Given the discussion thus far and with reference to the exemplary embodiments discussed above and the drawings, it will be appreciated that, in general terms, an exemplary method for discovering user/group profiles based on deep network analysis and optionally social or geolocation correlation and providing content regarding users includes processing user authorization requests and/or user account registration data transmitted to the on-site wireless network from mobile devices within the venue and obtaining hashed user identification data and network traffic data from the on-site wireless network (e.g. a Wi-Fi network). Inferred user profiles are obtained using the network traffic data. The inferred user profiles are correlated with the mobile device identities. The inferred user profiles are optionally cross-matched with user social profiles to obtain verified user profiles. By focusing on situational insights based on user cyber activities, near real-time insight can be obtained regardless of ISP domain, device and service types. The user does not need to be active on social apps. Inferred user profiles are aggregated into user profile groups that match one or more user profile models. The user profile groups are matched with a content provider's intended target profile and content is transmitted to the mobile devices corresponding to the targeted group profile and based on the correlation of the inferred user profiles with the identities of the mobile devices. In one or more embodiments, establishing identities of the mobile devices is based on a combination of one or more network identifiers as well as mobile device signatures and browser signatures.

Correlating the inferred user profiles with the identities of the mobile devices provides a technical advantage—for example, otherwise, a fragmented view would result when the user device turns off and back on. Absent the correlation, the system would "think" the device that was turned back on was in fact a new device; because of this correlation, the device can be matched to the same user after it powers back on.

A system for providing content regarding users of mobile devices such as smartphones is provided in accordance with a further aspect. The system 450 includes an on-site wireless network configured for processing user authorization requests and/or user account registration data from mobile devices within a venue and facilitating communication between authorized mobile devices within the venue and content providers. A network analytics engine 455 is configured for receiving hashed user identification data and network traffic data 457 from the on-site wireless network, obtaining inferred user profiles using URLs and IP headers obtained from the network traffic data, and optionally cross-matching the inferred user profiles with user social profiles and/or geolocation data to obtain verified, inferred user profiles. The inferred user profiles are aggregated into user profile groups. The network analytics engine is further configured for receiving target user group profile data from a content provider 458, matching the target group profile data received from the content provider with the user profile groups to obtain a set of mobile device users having a targeted group profile, and transmitting a set of hashed user identifications corresponding to the users having the targeted group profile to the on-site wireless network 452. The on-site wireless network is further configured for transmitting content to the mobile devices (users 453) corresponding to the targeted group profile and based on the correlation of the inferred user profiles with the identities of the mobile devices. The network analytics engine 455 may be configured to establish identities of the mobile devices based on a combination of network addresses, device signatures and browser signatures, and to correlate the inferred user profiles with the mobile device identities. The network analytics engine 455 may include a data content analyzer 208, an insight correlation engine 210, and a profile and trend inference 212. In some embodiments, these elements 208, 210, 212 include distinct software modules. The data content analyzer is configured to determine which URLs obtained from network traffic data are associated with web pages viewable to users of the mobile devices. The data content analyzer is further configured to conduct domain pulls and IP reverse lookups using IP headers to identify one or more of destination regions, service types and apps. The insight correlation engine 210 processes the outputs of the data content analyzer. The insight correlation engine performs web page content analysis by identifying one or more ranked keywords and correlating identified ranked keywords to infer mobile device user interests. The insight correlation engine is further configured to obtain content type reflecting user interests by performing a keyword search on a URL text string, and conducting URL text parsing. The insight correlation engine 212 is configured to provide output data to the profile and trend inferencer, the profile and trend inferencer being configured to match the output data to a set of user profile models to obtain the inferred user profiles. The profile and trend inference may be further configured to a provide a summary analysis of the top attributes exhibited by the majority of the inferred user profiles, thereby identifying a trend.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a di splay and keyboard.

One or more embodiments can be at least partially implemented in the context of a cloud or virtual machine environment, although this is exemplary and non-limiting. Reference is made back to FIGS. 1-3 and accompanying text. Consider, e.g., deep network analysis functionality in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not a network analytics engine 455 including sub-modules 208, 210, 212 and optionally 214, 216, 218.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for providing content regarding users of mobile devices within a venue comprising an on-site wireless network, comprising:
   a memory; and
   at least one processor coupled to the memory, the processor being operative to:
   process user authorization requests and/or user account registration data from mobile devices within the venue;
   receive hashed user identification data and network traffic data from the on-site wireless network, establish identities of the mobile devices based on a combination comprising at least two of:
  network identifiers,
  mobile device signatures, and
  browser signatures,
infer user profiles from uniform resource locators (URLs) and Internet Protocol (IP) headers within the network traffic data,
correlate the inferred user profiles with the identities of the mobile devices,
create a group profile by detecting one or more common characteristics of a plurality of users operating on the on-site wireless network within the venue, the one or more common characteristics determined by analyzing the network traffic data available to the on-site wireless network that characterizes network traffic of the plurality of users
match the group profile with a content provider's intended target profile, and
transmit to the on-site wireless network hashed user identification data for selected ones of the mobile devices based on the group profile matching the content provider's intended target profile and based on the correlation of the inferred user profiles with the identities of the mobile devices, wherein content is transmitted by the on-site wireless network to a proper subset of the mobile devices, the proper subset comprising the selected ones of the mobile devices,
wherein the inferred user profiles are not provided to the on-site wireless network or to the content providers.

2. The system of claim 1, wherein the on-site wireless network comprises a Wi-Fi network.

3. The system of claim 1, wherein the processor is operative to infer the user profiles by:
  extracting social data from one or more social media sites,
  obtaining social profiles from the social data,
  determining which of the inferred user profiles obtained from the traffic data are consistent with the social profiles to obtain verified inferred user profiles, and
  creating the group profile based on the inferred user profiles.

4. The system of claim 1, wherein the processor is operative to infer the user profiles by determining which of the URLs are associated with web pages viewable to users of the mobile devices and outputting a set of viewable web pages.

5. The system of claim 1, wherein IP headers are used to conduct:
  Whois domain pulls,
  IP reverse lookups,
  knowledge search for non-hypertext transfer protocol (non-HTTP) traffic categories based on destination IP address(es) obtained from the IP reverse lookups, and domain meta search using a plurality of search engines.

6. The system of claim 4, wherein the processor is operative to infer the user profiles by processing the output set of viewable web pages at least in part by:
  performing knowledge search for web page categories based on the URLs,
  performing web page content analysis by identifying one or more ranked keywords within the set of viewable web pages, and
  correlating identified ranked keywords to infer mobile device user interests.

7. The system of claim 4, wherein the processor is operative to infer the user profiles by obtaining content type reflecting user interests based on the first output from the data content analyzer by:
  applying structured correlation to a URL text string to infer page structure of a web server based on structural information extracted from the web pages,
  performing a keyword search on the URL text string, and
  conducting URL text parsing to obtain components from the URL text string.

8. A non-transitory computer readable medium comprising computer executable instructions which when executed by a computer cause the computer to perform a method of providing content regarding users of mobile devices within a venue comprising an on-site wireless network, the method comprising:
  processing user authorization requests and/or user account registration data transmitted to the on-site wireless network from mobile devices within the venue;
  obtaining hashed user identification data and network traffic data from the on-site wireless network;
  establishing identities of the mobile devices based on a combination comprising at least two of:
    network identifiers,
    mobile device signatures, and
    browser signatures;
  inferring user profiles based on uniform resource locators (URLs) and Internet Protocol (IP) headers obtained from the network traffic data;
  correlating the inferred user profiles with the identities of the mobile devices;
  creating a group profile by detecting one or more common characteristics of a plurality of users operating on the on-site wireless network within the venue, the one or more common characteristics determined by analyzing the network traffic data available to the on-site wireless network that characterizes network traffic of the plurality of users;
  matching the group profile with a content provider's intended target profile; and
  transmitting to the on-site wireless network hashed user identification data for selected ones of the mobile devices based on the group profile matching the content provider's intended target profile and based on the correlation of the inferred user profiles with the identities of the mobile devices, wherein content is transmitted by the on-site wireless network to a proper subset of the mobile devices, the proper subset comprising the selected ones of the mobile devices and
  wherein the inferred user profiles are not provided to the on-site wireless network or to the content providers.

9. The system of claim 4, wherein determining which of the URLs are associated with viewable web pages comprises:
  identifying and pulling advertisements,
  background access filtering, and
  pattern-based grouping.

10. The system of claim 9, wherein:
  the background access filtering removes social platform plugin communications and collection calls for data or cookies, and
  the pattern-based grouping removes dynamic pages and web objects.

11. The system of claim 1, wherein inferring the user profiles comprises generating a time series by correlating data points for a mobile device using the established identity for the mobile device.

12. The system of claim 11, wherein inferring the user profiles further comprises:
creating additional data points for the mobile device to represent data obtainable from a social network, and
identifying a coherent profile or trends for the mobile device by examining the data points comprising the correlated data points and the additional data points.

13. The system of claim 12, wherein inferring the user profiles comprises:
inferring an individual user profile based on the time series for the mobile device, at least in part by:
aggregating similar data within the time series, and
filtering away scarce or contradictory data within the time series; and
combining one or more of the individual user profiles into a validated user profile at least in part by:
aggregating and promoting similar user attributes across multiple profile instances, and
demoting attributes that appear in few profile instances.

14. The system of claim 1, wherein inferring the user profiles comprises using at least one of a machine learning model and an artificial neural network.

15. The system of claim 1, wherein inferring the user profiles comprises:
determining an inferred user profile based on a single instance of the mobile device accessing a website, and
validating the inferred user profile over multiple instances, the multiple instances comprising at least one of:
the mobile device repeatedly visiting the website, and
the mobile device accessing a plurality of webpages within the website.

16. The system of claim 1, wherein the group profile is based at least in part on social data and/or geolocation data in addition to the network data.

17. The system of claim 1, wherein, in said establishing of said identities of said mobile devices, said combination comprises all three of:
said network identifiers,
said mobile device signatures, and
said browser signatures.

* * * * *